US006865384B2

(12) United States Patent
Sagi et al.

(10) Patent No.: US 6,865,384 B2
(45) Date of Patent: Mar. 8, 2005

(54) METHOD AND COMMUNICATION NETWORK FOR ROUTING A REAL-TIME COMMUNICATION MESSAGE BASED ON A SUBSCRIBER PROFILE

(75) Inventors: Uday C. Sagi, Fort Worth, TX (US); Steven E. Trine, Keller, TX (US); Linda M. Trine, Keller, TX (US); Peter C. Peddie, Gilroy, CA (US)

(73) Assignee: Motorola, Inc., Schaumburg, IL (US)

( * ) Notice: Subject to any disclaimer, the term of this patent is extended or adjusted under 35 U.S.C. 154(b) by 238 days.

(21) Appl. No.: 10/000,289

(22) Filed: Nov. 2, 2001

(65) Prior Publication Data

US 2003/0087632 A1 May 8, 2003

(51) Int. Cl.[7] .................................................. H04Q 7/20
(52) U.S. Cl. .............................. 455/412.1; 455/414.1; 455/414.2; 455/433; 455/422.1
(58) Field of Search ................................ 455/432, 433, 455/412–417, 461, 462, 466, 422.1

(56) References Cited

U.S. PATENT DOCUMENTS

| 5,950,123 | A | | 9/1999 | Schwelb et al. | |
|---|---|---|---|---|---|
| 6,108,540 | A | | 8/2000 | Sonti et al. | |
| 6,216,165 | B1 | | 4/2001 | Woltz et al. | |
| 6,345,279 | B1 | * | 2/2002 | Li et al. | 707/104.1 |
| 6,430,604 | B1 | * | 8/2002 | Ogle et al. | 709/207 |
| 6,463,463 | B1 | * | 10/2002 | Godfrey et al. | 709/206 |
| 6,463,464 | B1 | * | 10/2002 | Lazaridis et al. | 709/207 |
| 6,505,237 | B2 | * | 1/2003 | Beyda et al. | 709/206 |
| 6,643,684 | B1 | * | 11/2003 | Malkin et al. | 709/206 |

FOREIGN PATENT DOCUMENTS

WO   WO 02/35778   *   5/2002   .......... H04L/12/56

OTHER PUBLICATIONS

Sundborg, J., *Universal Personal Telecommunication (UPT)—Concept and Standardisation*, Ericsson Review, No. 4, Apr. 1993, pp. 140–155.
Eleftheriadis et al., *User Profile Identification in Future Mobile Telecommunications Systems*, IEEE Network, Sep./Oct. 1994, pp. 33–39.
International Search Report PCT/US02/34638 dated Apr. 21, 2003.

* cited by examiner

*Primary Examiner*—Duc M. Nguyen
(74) *Attorney, Agent, or Firm*—Marshall, Gerstein & Borun LLP

(57) ABSTRACT

In accordance with the preferred embodiments of the present invention, a method and a communication network for routing a real-time communication message based on a subscriber profile in a communication system. The communication system provides real-time communication service to a plurality of subscribers such that a first subscriber is in communication with a second subscriber. The communication network (110) receives a real-time communication message from the first subscriber. The communication network (110) also retrieves a subscriber profile associated with the second subscriber. In particular, the subscriber profile includes operating information associated with a wireless device (220 and/or 230) operated by the second subscriber. Based on the subscriber profile, the communication network (110) arranges the message for transmission to the second subscriber. Accordingly, the communication network (110) transmits the arranged message to the second subscriber.

12 Claims, 3 Drawing Sheets

US 6,865,384 B2

METHOD AND COMMUNICATION NETWORK FOR ROUTING A REAL-TIME COMMUNICATION MESSAGE BASED ON A SUBSCRIBER PROFILE

FIELD OF THE INVENTION

The present invention relates generally to communication systems, and more particularly, to a method and a communication network for routing a real-time communication message based on a subscriber profile.

BACKGROUND OF THE INVENTION

A wireless communication system is a complex network of systems and elements. Typically elements include (1) a radio link to the mobile stations (e.g., cellular telephones), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a call controller (e.g., a mobile switching center (MSC)) or switch, typically a call agent (i.e., a "softswitch"), for routing calls within the system, and (5) a link to the land line or public switch telephone network (PSTN), which is usually also provided by the call agent.

For many people, the Internet has provided alternative ways of communication. In particular, electronic mail messages (i.e., e-mail) have replaced traditional letters and sometimes voice calls as a way of communicating. However, e-mail may not provide a response fast enough in certain circumstances. Further, multiple exchanges of e-mails may require a number of steps to read, reply, and send the e-mails back and forth. Accordingly, real-time communication service such as instant messaging (IM) service and group chat service is becoming a communication mechanism to substitute for e-mail. For example, instant messaging service permits a subscriber to determine whether other subscribers such as friends or co-workers are connected to the Internet, and if so, to communicate with each other in "real time" over the Internet. Under most circumstances, real-time communication is "instant." Even during peak periods of the Internet, delay of real-time communication is typically less than a few seconds. Thus, subscribers may have a real-time online "conversation" by exchanging messages with each other (i.e., sending messages back and forth). For example, parents may be able to "talk" with their children who are attending college or working in other cities, states, or countries via real-time communication service. As a result, real-time communication service may even replace voice calls because of cost and convenience.

One aspect of designing a wireless communication system is to provide real-time communication service to mobile stations, i.e., wireless devices such as cellular telephones, pagers, and electronic planners. In particular, a real-time communication message may include a voice message, a textual message, an image file, a video file, and an audio file. In addition, the real-time communication message may include more than one component (e.g., a voice message and an image file). Thus, a subscriber may prefer to receive one component of the real-time communication message on one wireless device and receive a second component of the real-time communication message on a second wireless device. Further, the subscriber to real-time communication service may prefer to receive a real-time communication message in a particular format. While attending a meeting or a seminar, for example, the subscriber may prefer to receive the real-time communication message in textual message format via a cellular telephone even though the cellular telephone may be operable to receive a message in either voice message format or textual message format. However, wireless devices have resource limitations such that the wireless devices may not be operable to handle certain contents and files of a real-time communication message. For example, a pager and an electronic planner may not be operable to handle a voice message whereas a cellular telephone may be more adapted to send and receive a voice message but not an image file or a video file.

Therefore, a need exists for a method and a communication network to route a real-time communication message based on the resource of a wireless device and the preference of a subscriber.

DETAIL DESCRIPTION OF THE PREFERRED EMBODIMENTS

The present invention provides a method and a communication network for routing a real-time communication message based on a subscriber profile in a communication system. The communication system provides real-time communication service such as instant messaging service and group chat service to a plurality of subscribers. In particular, a first subscriber is in communication with a second subscriber operating a wireless device such as a cellular telephone, a pager, and an electronic planner (i.e., a personal digital assistant (PDA)). The communication network receives a real-time communication message from the first subscriber. In particular, the real-time communication message may be, but is not limited to, a voice message, a textual message, an image file, a video file and an audio file. The communication network also retrieves a subscriber profile associated with the second subscriber. The subscriber profile includes operating information associated with a wireless device operated by the second subscriber. For example, the operating information may include, but is not limited to, resource information (i.e., operating format), preference information (i.e., preference format) and a time-stamp parameter associated with the wireless device. The operating format and the preference format may be, but are not limited to, a voice message format, a textual message format, an image file format, a video file format, an audio file format and a language format. Based on the subscriber profile, the communication network arranges the real-time communication message for transmission to the second subscriber. For example, the communication network converts the real-time communication message to a preference format for transmission to the second subscriber. Accordingly, the communication network transmits the arranged real-time communication message to the second subscriber.

Figure 1:
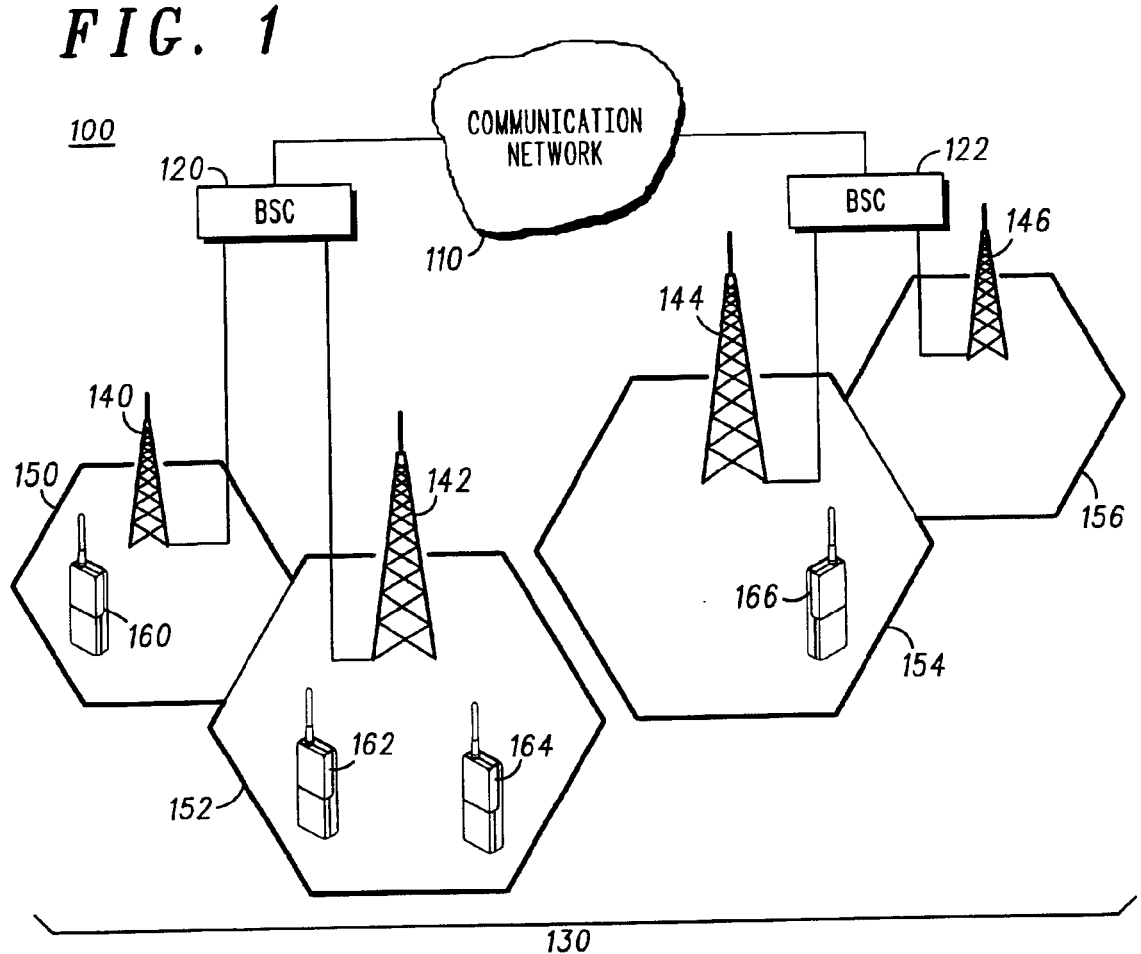
FIG. 1 is a block diagram representation of a wireless communication system that may be adapted to operate in accordance with the preferred embodiments of the present invention.

The communication system in accordance with the present invention is described in terms of several preferred embodiments, and particularly, in terms of a wireless communication system operating in accordance with at least one of several communication standards. These standards include analog, digital or dual-mode communication system protocols such as, but not limited to, the Advanced Mobile Phone System (AMPS), the Narrowband Advanced Mobile Phone System (NAMPS), the Global System for Mobile Communication (GSM), the IS-55 Time Division Multiple Access (TDMA) digital cellular, the IS-95 Code Division Multiple Access (CDMA) digital cellular, CDMA 2000, the Personal Communications System (PCS), 3G and variations and evolutions of these protocols. As shown in FIG. 1, a wireless communication system 100 includes a communication network 110, a plurality of base station controllers (BSC), generally shown as 120 and 122, servicing a total service area 130. The wireless communication system 100 may be, but is not limited to, a frequency division multiple access (FDMA) based communication system, a time division multiple access (TDMA) base communication system, and a code division multiple access (CDMA) based communication system. As is known for such systems, each BSC 120 and 122 has associated therewith a plurality of base stations (BS), generally shown as 140, 142, 144, and 146, servicing communication cells, generally shown as 150, 152, 154, and 156, within the total servicing area 130. The BSCs 120 and 122, and BSs 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill. The communication network 110 provides communication such as instant messaging and group chat session between the MSs 160, 162, 164, and 166 and wired elements, generally shown as 170 and 172.

Figure 2:
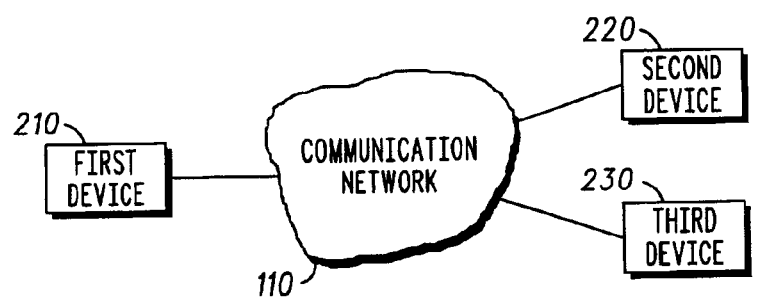
FIG. 2 is a block diagram representation of a communication system providing real-time communication service that may be adapted to operate in accordance with the preferred embodiments of the present invention.

As shown in FIG. 2, a communication system providing real-time communication service generally includes a communication network (one shown as 110) and a plurality of subscriber devices, which are generally shown as a first device 210, a second device 220, and a third device 230. The plurality of subscriber devices may be, but are not limited to, wired devices such as desktop computers and laptop computers, and wireless devices such as cellular telephones, pagers, and electronic planners. The plurality of subscriber devices is operatively coupled to the communication network 110, which may be, but is not limited to, an Internet Protocol (IP) network. The communication network 110 provides a plurality of subscribers with real-time communication services such as instant messaging service and group chat service. In particular, the communication network 110 is coupled to the first device 210, which is operated by a first subscriber and a second device 220, which is operated by a second subscriber. Accordingly, the communication network 110 is operable to provide instant messaging service to the first subscriber and the second subscriber. Further, the communication network 110 is coupled to the third device 230, which may also be operated by the second subscriber.

A basic flow for routing a real-time communication message based on a subscriber profile that may be applied with the preferred embodiment of the present invention shown in FIG. 2 may start with the communication network 110 receiving a real-time communication message from the first subscriber via the first device 210. The communication network 110 retrieves a subscriber profile associated with the second subscriber. The subscriber profile includes operating information associated with a wireless device operated by the second subscriber (i.e., the second device 220 and/or the third device 230). In particular, the operating information may include, but is not limited to, a time-stamp parameter, resource information including operating format and preference information including preference format that are associated with the wireless device. The time-stamp parameter indicates the last activity or the most recent activity of the wireless device. The operating and preference formats, may be, but are not limited to, voice message format, textual message format, image file format, video file format, audio file format and language format. For example, the second device 220 may be a cellular telephone and the third device 230 may be an electronic planner. Accordingly, the operating information associated with the cellular telephone may include voice message format and textual message format as operating formats and voice message format as a preference format whereas the operating information associated with the electronic planner may include textual message format and image file format as operating formats and without a preference format. Based on the subscriber profile as described above, the communication network 110 arranges the real-time communication message for transmission to the second subscriber. For example, the communication network 110 may convert a real-time communication message in voice message format to textual message format so that a pager may be operable to receive the real-time communication message. In another example, a real-time communication message may include a textual message and an image file. However, the communication network 110 may exclude the transmission of an image file because the pager may only be operable to receive textual message format. Alternatively, the second subscriber may operate an electronic planner (i.e., the third device 230) in addition to the pager (i.e., the second device 220). Thus, the communication network 110 may arrange the real-time communication message so that the textual message is transmitted to the pager whereas the image file is transmitted to the electronic planner.

Figure 3:
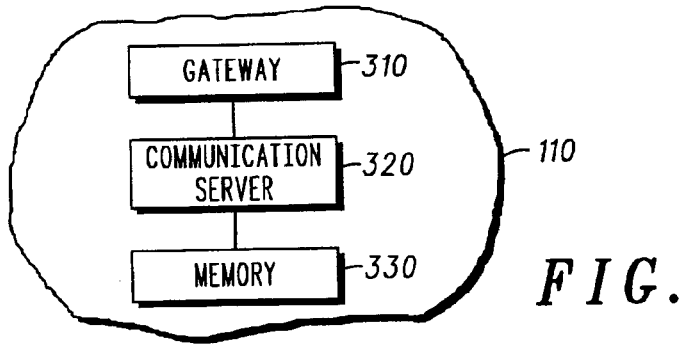
FIG. 3 is a block diagram representation of a communication network that may be adapted in accordance with the preferred embodiments of the present invention.

Referring to FIG. 3, the communication network 110 generally includes a gateway 310, a communication server 320, and a memory 330. The gateway 310 may be, but is not limited to, a wireless application protocol (WAP) gateway. The gateway 310 is operatively coupled to a plurality of subscriber devices (generally shown as 210, 220, and 230 in FIG. 2) such that the plurality of subscriber devices may be operable for Internet access. Further, the gateway 310 is operatively coupled to the communication server 320, which may be, but is not limited to, a server operable to provide instant messaging service and a server operable to provide group chat service. In particular, the communication server 320 provides exchange of, but not limited to, voice messages, textual messages, image files, and video files between a plurality of subscribers. The communication server 320 is operatively coupled to the memory 330, which is operable to store a plurality of subscriber profiles that include operating information associated with a wireless device operated by a subscriber. In addition, the memory stores a program or a set of operating instructions. Accordingly, the server 320 executes the program or the set of operating instructions such that the communication network 110 operates in accordance with a preferred embodiment of the invention. The program or the set of operating instructions may be embodied in a computer-readable medium such as, but not limited to, paper, a programmable gate array, application specific integrated circuit, erasable programmable read only memory, read only memory, random access memory, magnetic media, and optical media.

A basic flow for routing a real-time communication message based on a subscriber profile that may be applied with the preferred embodiment of the present invention shown in FIG. 3 may start with a first subscriber and a second subscriber being in real-time communication with each other. The communication server 320 receives a real-time communication message from the first subscriber via the gateway 310. The real-time communication message may be, but is not limited to, a voice message, a textual message, an image file, a video file and an audio file. The communication server 320 retrieves a subscriber profile from the memory 330. The subscriber profile includes operating information associated with a wireless device operated by the second subscriber. In particular, operating information may be, but is not limited to, resource information and preference information associated with the wireless device. The resource information may include an operating format of the wireless device whereas the preference information may include a preference format of the wireless device. The operating format and the preference format may be, but are not limited to, voice message format, textual message format, image file format (e.g., graphics interchange format (GIF), joint photographic experts group (JPEG) format, and wireless bitmap (WBMP) format), video file format, audio file format (e.g., MPEG Audio Layer-3 (MP3) and language format. For example, the wireless device may be a cellular telephone operable to receive real-time communication messages in either voice message format or textual message format but the subscriber operating the cellular telephone (i.e., the second subscriber) may prefer to receive real-time communication messages in voice message format. Thus, the operating formats of the cellular telephone are voice message and textual message formats, and the preference format is voice message format. Based on the subscriber profile, the communication server 320 arranges the real-time communication message from the first subscriber for transmission to the second subscriber. For example, the communication server 320 may convert a real-time communication message in textual message format to voice message format for transmission to the cellular telephone described above. In an alternate embodiment, the communication server 320 may arrange the real-time communication message for transmission to the second subscriber based on the subscriber profile in response to a subscriber input. The subscriber input may be, but is not limited to, an input via a numeric keypad, an alphanumeric keypad, a touch-sensitive display and a microphone. For example, the communication server 320 may convert the real-time communication message in textual message format as described above to voice message format in response to the second subscriber pressing a key on the cellular telephone. Accordingly, the communication server 320 transmits the arranged real-time communication message to the wireless device operated by the second subscriber via the gateway 310.

Figure 4:
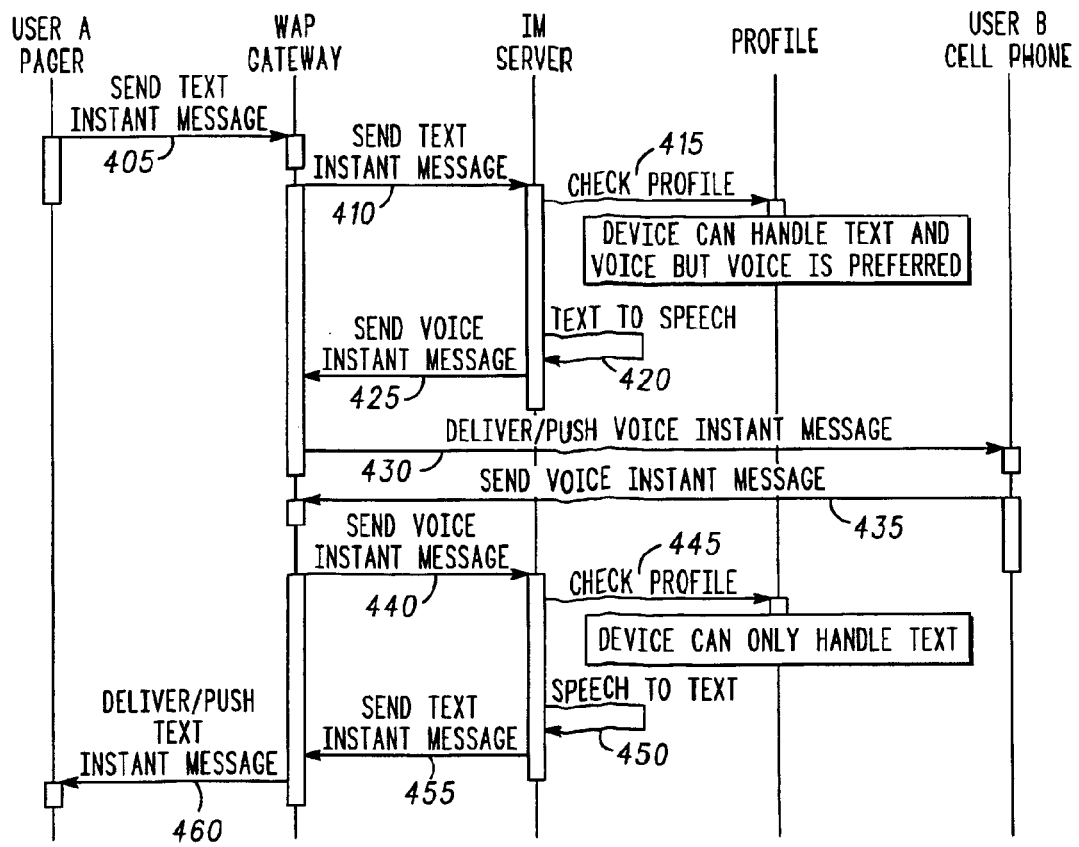
FIG. 4 is a flow diagram representation of a communication system that may be adapted in accordance with an alternate embodiment of the present invention.

In accordance with an alternate embodiment of the present invention, and with references to FIG. 4, an exemplary flow 400 for routing a real-time communication message based on a subscriber profile is shown. At step 405, User A sends an instant message in textual format from a pager to User B via a WAP gateway. Accordingly, the WAP gateway sends the instant message from User A to an instant messaging (IM) server at step 410. The IM server at step 415 retrieves a subscriber profile associated with User B in response to User B registering for instant messaging service via a cellular telephone. In particular, the subscriber profile includes operating information associated with the cellular telephone. For example, the operating information includes textual message format and voice message format as operating formats and voice message format as the preference format for the cellular telephone. Further, at step 420, the IM server converts the instant message in textual message format from the pager to voice message format for transmission to the cellular telephone. The IM server at step 425 sends the converted instant message (i.e., the instant message originally from User A is now in voice message format) to the WAP gateway for transmission to User B. At step 430, the WAP gateway sends the converted instant message to the cellular telephone operated by User B. In response to the converted instant message, at step 435, User B sends an instant message in voice message format from the cellular telephone to User A via the WAP gateway. Accordingly, the WAP gateway sends the instant message from User B to the IM server at step 440. The IM server at step 445 retrieves a subscriber profile associated with the pager operated by User A. In particular, the operating format of the pager is textual message format only (i.e., the subscriber profile does not include a preference format). As a result, the IM server at step 450 converts the instant message in voice message format from the cellular telephone to textual message format for transmission to the pager. At step 455, the IM server sends the converted instant message (i.e., the instant message originally from User B is now in textual message format) to the WAP gateway for transmission to User A. The WAP gateway sends the converted instant message to the pager operated by User A at step 460.

Figure 5:
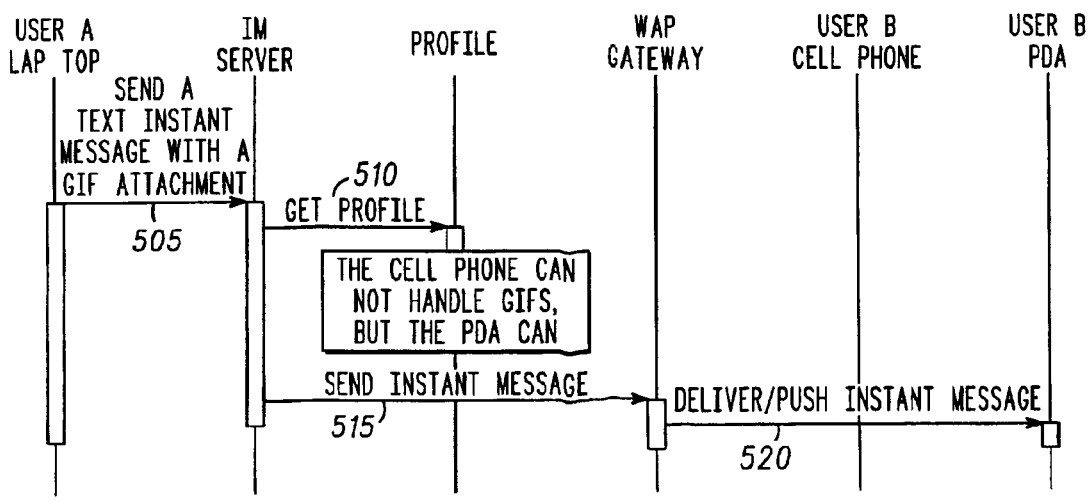
FIG. 5 is a flow diagram representation of a communication system that may be adapted in accordance with another alternate embodiment of the present invention.

In accordance with another alternate embodiment of the present invention, and with references to FIG. 5, an exemplary flow 500 for routing a real-time communication message based on a subscriber profile is shown. At step 505, User A sends an instant message from a laptop computer to an IM server. In particular, the instant message includes a textual message and a GIF file. The IM server at step 510 retrieves a subscriber profile associated with User B in response to User B registering for real-time communication service via a cellular telephone and an electronic planner (i.e., a personal digital assistant (PDA)). The subscriber profile includes operating information associated with the cellular telephone and the PDA operated by User B. In particular, the operating information associated with the PDA includes GIF as an operating format whereas the operating information associated with the cellular telephone does not include GIF as an operating format. Based on the subscriber profile associated with User B, the IM server sends the instant message from User A to a WAP gateway for transmission to one of the wireless devices operated by User B (i.e., either the cellular telephone or the PDA) at step 515.

As a result, the WAP gateway at step 520 sends the instant message including the textual message and the GIF file to the PDA operated by User B rather than sending the instant message from User A to the cellular telephone operated by User B.

Figure 6:
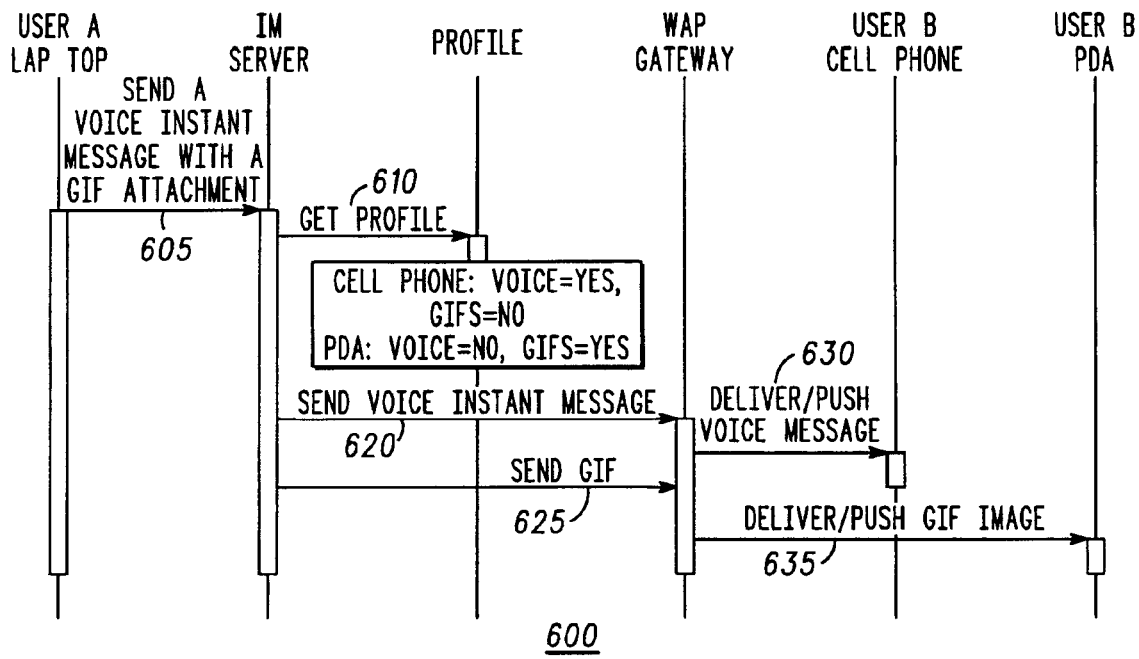
FIG. 6 is a flow diagram representation of a communication system that may be adapted in accordance with yet another alternate embodiment of the present invention.

In accordance with yet another alternate embodiment of the present invention, and with references to FIG. 6, an exemplary flow 600 for routing a real-time communication message based on a subscriber profile is shown. At step 605, User A sends an instant message from a laptop computer to an IM server. The instant message from User A includes a first component and second component. In particular, the instant message includes a voice message and a GIF file. The IM server at step 510 retrieves a subscriber profile associated with User B in response to User B registering for real-time communication service via a cellular telephone and a PDA. The subscriber profile includes operating information associated with the cellular telephone and the PDA operated by User B. The operating information associated with the PDA includes GIF but not voice message format as an operating format. In contrast, the operating information associated with the cellular telephone includes voice message format but not GIF as an operating format. Based on the subscriber profile associated with User B, the IM server arranges the first and second components of the instant message from User A for transmission to the proper wireless device operated by User B. Accordingly, the IM server sends the first component (i.e., the voice message) to a WAP gateway for transmission to the cellular telephone at step 620. At step 625, the IM server also sends the second component (i.e., the GIF file) to the WAP gateway but for transmission to the PDA instead. As a result, the WAP gateway sends the voice message of the instant message to the cellular telephone operated by User B at step 630 and sends the GIF file of the instant message to the PDA operated by User B at step 635.

Figure 7:
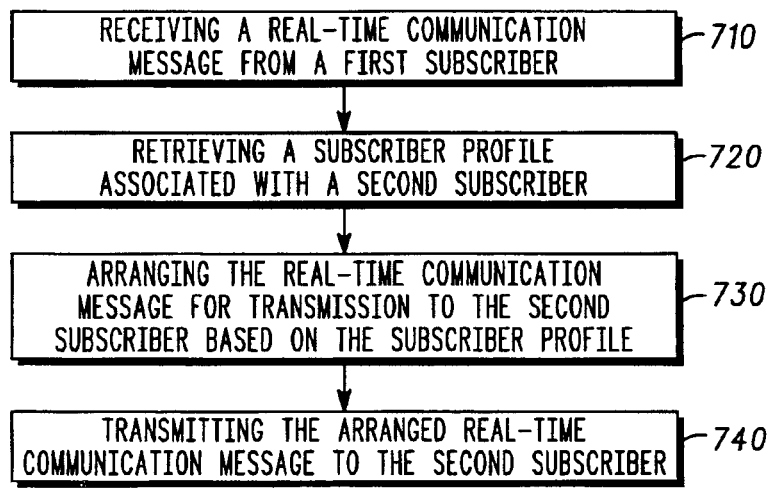
FIG. 7 is a flow diagram representation of a method for routing a real-time communication message based on a subscriber profile in accordance with the preferred embodiments of the present invention.

In accordance with the preferred embodiments of the present invention, and with references to FIG. 7, a method 700 for routing a real-time communication message based on a subscriber profile is shown. Method 700 begins at step 710, where a communication network receives a real-time communication message such as an instant message from a first subscriber. At step 720, the communication network retrieves a subscriber profile associated with a second subscriber. The subscriber profile may be pre-stored in a memory and/or updated in response to the second subscriber registering for real-time communication service. In particular, the subscriber profile includes operating information associated with a wireless device (e.g., a cellular telephone, a pager, and an electronic planner) that is operated by the second subscriber. The operating information includes resource information (e.g., operating format) and preference information (e.g., preference format) associated with the wireless device. Further, the operating format and preference format may include, but is not limited to, voice message format, textual message format, image file format, video file format, audio file format and language format. For example, the second subscriber may operate a pager and an electronic planner for real-time communication service. Accordingly, the subscriber profile associated with the second subscriber may include textual message format and image file format as operating formats for the PDA whereas only textual message format is available for the pager. At step 730, the communication server arranges the real-time communication message from the first subscriber for transmission to the second subscriber based on the subscriber profile. In particular, the communication server may convert a real-time communication message from a first format to a second format for transmission to the wireless device operated by the second subscriber because the wireless device may operable to receive the message in the second format only or the second subscriber may prefer to receive the message in the second format via the wireless device. For example, a pager may be operable to receive a real-time communication message in textual message format only. Thus, the communication network may convert a voice message to a textual message for transmission to the pager. In another example, the second subscriber may prefer to receive a real-time communication message in voice message format. Accordingly, the communication network may convert a textual message to a voice message based on the second subscriber's preference. In yet another example, the second subscriber may prefer to receive textual message in a particular language (e.g., English, Spanish, Chinese, Japanese, German, French, etc.). As a result, the communication network may convert a textual message in a first language (e.g., English) to a second language (e.g., Spanish).

Further, the real-time communication message from the first subscriber may include a first component being in a first format and a second component being in a second format. Based on the subscriber profile, the communication server may drop one of the components of the real-time communication message for transmission to the second subscriber. In which case, a message or an icon may be sent to the first subscriber to indicate the resources of the wireless device operated by the second subscriber that one of the components is dropped. For example, the second subscriber operating a cellular telephone may able to receive a textual message of a real-time communication message but not an attached GIF file. Thus, the communication server may transmit the textual message to the pager but drop the GIF file for transmission to the cellular telephone. Alternatively, the communication server may convert a potentially dropped component (e.g., the GIF file) of a real-time communication message into a format that the pager may be operable to receive (e.g., wireless bitmap (WBMP) format). For example, the communication server may convert the GIF file to a WBMP in response to a subscriber input from the second subscriber. The subscriber input may be, but is not limited to, an input via a numeric keypad, an alphanumeric keypad, a touch-sensitive display and a microphone.

In an alternate embodiment, the second subscriber may operate a plurality of wireless devices for real-time communication service. Thus, the communication server may arrange the components of a real-time communication message for transmission to the plurality of wireless devices operated by the second subscriber. For example, the second subscriber may register for real-time communication service via a cellular telephone, a pager and an electronic planner. The real-time communication message may include a voice message, a textual message, a GIF file, and a video file. Based on the subscriber profile of the second subscriber, the communication server may arrange the voice message for transmission to the cellular telephone, the textual message for transmission to the pager, and the GIF file and video file for transmission to the electronic planner. Further, the second subscriber may register for real-time communication service via another pager (i.e., a second pager) in addition to the pager described above (i.e., a first pager). To avoid duplicate copies of the textual message transmitted to the second subscriber, the subscriber profile may include a time-stamp parameter associated with each of the first and second pagers. In particular, the time-stamp parameter associated with the first pager may indicate the time of the most recent activity by the second subscriber via the first pager, and the time-stamp parameter associated with the second pager may indicate the time of the most recent activity by the second subscriber via the second pager. For example, the time-stamp parameter associated with the first pager is one minute whereas the time-stamp parameter associated with the second pager is thirty seconds. That is, the most recent activity on the first pager was a one minute ago and the most recent activity on the second pager was thirty seconds ago. Based on the time-stamp parameter, the communication network may arrange the textual message for transmission to the second pager only to avoid transmission of duplicates copies of the textual message to the second subscriber.

Referring back to FIG. 7, at step 740, the communication server transmits the arranged real-time communication message to the wireless device operated by the second subscriber. Therefore, a real-time communication message is properly routed based on a subscriber profile.

Many changes and modifications could be made to the invention without departing from the fair scope and spirit thereof. The scope of some changes is discussed above. The scope of others will become apparent from the appended claims.

What is claimed:

1. In a communication system, the communication system providing real-time communication service to a plurality of subscribers, wherein a first subscriber is in communication with a second subscriber, a method for routing a real-time communication message based on a subscriber profile comprising:

providing a network gateway having a memory adapted to store a plurality of user profiles;

receiving a real-time communication message from the first subscriber, the real-time communication comprising a header and a plurality of components;

retrieving a subscriber profile associated with the second subscriber, the subscriber profile including operating information associated with first and second wireless communication devices operated by the second subscriber;

arranging the real-time communication message for transmission to the second subscriber based on the subscriber profile, wherein a first component of the real-time communication message having a first file type is arranged for transmission to the first wireless device operated by the second subscriber and a second component of the real-time communication message having a second file type is arranged for transmission to the second wireless communication device operated by the second subscriber; and transmitting the arranged real-time communication message to the second subscriber.

2. The method of claim 1 wherein the plurality of components comprises one of a voice message, a textual message, an image file, a video file, an audio file and an alternate language message.

3. The method of claim 1, wherein retrieving a subscriber profile associated with the second subscriber comprises retrieving a subscriber profile including operating information associated with one of a cellular telephone, a pager, and an electronic planner operated by the second subscriber.

4. The method of claim 1, wherein retrieving a subscriber profile associated with the second subscriber comprises retrieving a subscriber profile including one of resource information, preference information and time-stamp parameter associated with a wireless device operated by the second subscriber.

5. The method of claim 1, wherein retrieving a subscriber profile associated with the second subscriber comprises retrieving a subscriber profile including one of an operating format and a preference format associated with a wireless device operated by the second subscriber, and wherein the operating format and the preference format comprise one of a voice message format, a textual message format, an image file format, a video file format, an audio file format and a language format.

6. The method of claim 1, wherein arranging the real-time communication message based on the subscriber profile comprises converting the real-time communication message to a preference format for transmission to the second subscriber, and wherein the preference format is associated with one of the first and second wireless communication devices operated by the second subscriber.

7. The method of claim 1, wherein arranging the real-time communication message for transmission to the second subscriber based on the subscriber profile comprises converting the first component of the real-time communication message from the first file type to an other file type for transmission to the second subscriber.

8. The method of claim 1, wherein arranging the real-time communication message for transmission to the second subscriber based on the subscriber profile comprises converting the first component of the real-time communication message from the first file type to an other file type in response to a subscriber input, and wherein the subscriber input comprises an input via a numeric keypad, an alphanumeric keypad, a touch-sensitive display, and a microphone.

9. The method of claim 1, wherein arranging the real-time communication message for transmission to the second subscriber based on the subscriber profile comprises one of converting the real-time communication message from a voice message format to a textual message format for transmission to the second subscriber and converting the real-time communication message from a textual message format to a voice message format for transmission to the second subscriber.

10. The method of claim 1, wherein arranging the real-time communication message for transmission to the second subscriber based on the subscriber profile comprises converting the real-time communication message from a graphics interface file (GIF) format to a wireless bitmap (WBMP) format for transmission to the second subscriber.

11. The method of claim 1 wherein in the real time communication message comprises one of an instant message and group chat message.

12. The method of claim 1 further comprising:

maintaining a timestamp associated with each of the first and second wireless communication devices; and determining, based on the timestamp associated with each of the first and second wireless communication devices, which of the first and second wireless communication devices should receive the real-time communication message.

* * * * *